US012809984B2

(12) United States Patent
Lee et al.

(10) Patent No.: US 12,809,984 B2
(45) Date of Patent: Nov. 24, 2026

(54) SUPERVISED ANOMALY DETECTION IN FEDERATED LEARNING

(71) Applicant: International Business Machines Corporation, Armonk, NY (US)

(72) Inventors: Wei-Han Lee, White Plains, NY (US); Pengrui Quan, Los Angeles, CA (US); Mudhakar Srivatsa, White Plains, NY (US); Changchang Liu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 17/823,555

(22) Filed: Aug. 31, 2022

(65) Prior Publication Data

US 2024/0070286 A1 Feb. 29, 2024

(51) Int. Cl.
*G06F 21/00* (2013.01)
*G06F 21/56* (2013.01)
*G06F 21/57* (2013.01)

(52) U.S. Cl.
CPC ............ *G06F 21/577* (2013.01); *G06F 21/56* (2013.01); *G06F 2221/033* (2013.01)

(58) Field of Classification Search
CPC ................... G06F 21/577; G06F 21/56; G06F 2221/033
See application file for complete search history.

(56) References Cited

U.S. PATENT DOCUMENTS

| | | | | |
|---|---|---|---|---|
| 10,817,530 | B2 | 10/2020 | Siebel | |
| 10,938,634 | B1 | 3/2021 | Cruise | |
| 11,227,050 | B1 | 1/2022 | Gates | |
| 11,593,485 | B1 * | 2/2023 | Briliauskas | G06F 21/566 |
| 2018/0349605 | A1 * | 12/2018 | Wiebe | G06F 21/566 |
| 2019/0080089 | A1 * | 3/2019 | Chen | G06N 20/10 |
| 2019/0251479 | A1 * | 8/2019 | Anderson | H04L 63/1466 |
| 2021/0303695 | A1 * | 9/2021 | Grosse | G06F 17/18 |
| 2022/0245243 | A1 * | 8/2022 | Andreina | G06F 21/54 |
| 2023/0421586 | A1 * | 12/2023 | Jadav | G06N 20/20 |

OTHER PUBLICATIONS

Blanchard et al., "Machine Learning with Adversaries: Byzantine Tolerant Gradient Descent", 31st Conference on Neural Information Processing Systems, (NIPS 2017), Long Beach, CA, USA, 11 pages.

(Continued)

*Primary Examiner* — Ghazal B Shehni
(74) *Attorney, Agent, or Firm* — Harrity & Harrity, LLP

(57) ABSTRACT

A computer-implemented method, a computer program product, and a computer system for supervised anomaly detection in federated learning. A server in a federated learning system generates a training dataset including malicious data samples and benign data samples. The server trains update-generating models on the malicious data samples and the benign data samples in the training dataset. The server generates benign model updates and malicious model updates, through training the update-generating models. The server trains an anomaly detector on the malicious model updates and the benign model updates. The server deploys the anomaly detector to the federated learning system, for supervised anomaly detection in the federated learning system.

17 Claims, 5 Drawing Sheets

(56) References Cited

OTHER PUBLICATIONS

Disclosed Anonymously, "Correcting Image Anomalies Using Machine Learning", An IP.com Prior Art Database Technical Disclosure, IP.com No. IPCOM000252094D, IP.com Electronic Publication Date: Dec. 15, 2017, 36 pages.
Disclosed Anonymously, "Identifying and Categorizing Utility Power Anomalies", An IP.com Prior Art Database Technical Disclosure, IP.com No. IPCOM000251971D, IP.com Electronic Publication Date: Dec. 12, 2017, 33 pages.
Disclosed Anonymously, "Ranking and automatic selection of machine learning models", An IP.com Prior Art Database Technical Disclosure, IP.com No. IPCOM000252275D, IP.com Electronic Publication Date: Jan. 3, 2018, 34 pages.
Li et al., "Ditto: Fair and Robust Federated Learning Through Personalization", Proceedings of the 38th International Conference on Machine Learning, PMLR 139, 2021, 12 pages.
Pillutla et al., "Robust Aggregation for Federated Learning", arXiv:1912.13445v2 [stat.ML] Jan. 17, 2022, 43 pages.
Sun et al., "FL-WBC: Enhancing Robustness against Model Poisoning Attacks in Federated Learning from a Client Perspective", 35th Conference on Neural Information Processing Systems (NeurIPS 2021), 12 pages.
Weinger et al., "Enhancing IoT Anomaly Detection Performance for Federated Learning", printed on Aug. 1, 2022, 3 pages.
Xu et al., "Detecting AI Trojans Using Meta Neural Analysis", arXiv:1910.03137v1 [cs.AI] Oct. 8, 2019, 15 pages.
Yin et al. "Byzantine-Robust Distributed Learning: Towards Optimal Statistical Rates Supplementary Material", International Conference on Machine Learning, PMLR, 2018, 19 pages.

* cited by examiner

SUPERVISED ANOMALY DETECTION IN FEDERATED LEARNING

BACKGROUND

The present invention relates generally to federated learning, and more particularly to supervised anomaly detection in federated learning.

Federated learning aims to allocate a complicated learning process onto agents especially when the agents are reluctant to share their local data with a fusion server considering limited communication resources and data privacy issues. However, by its fundamental design, federated learning is inherently vulnerable to model poisoning attacks; a malicious client may submit the local updates to influence the weights of the global model. Existing methods of detecting model poisoning attacks either fail to analyze potential malicious data or are computationally restrictive.

Previous robust aggregation in federated learning mainly focus on transforming benign updates through various transformation strategies such as median of gradients, singular value decomposition (SVD), etc. However, these methods are only limited to unsupervised classification where only benign updates are analyzed.

SUMMARY

In one aspect, a computer-implemented method for supervised anomaly detection in federated learning is provided. The method includes generating, by a server in a federated learning system, a training dataset including malicious data samples and benign data samples. The method further includes training, by the server, update-generating models on the malicious data samples and the benign data samples in the training dataset. The method further includes generating, by the server, benign model updates and malicious model updates, through training the update-generating models. The method further includes training, by the server, an anomaly detector on the malicious model updates and the benign model updates. The method further includes deploying, by the server, the anomaly detector to the federated learning system, for supervised anomaly detection in the federated learning system.

In another aspect, a computer program product for supervised anomaly detection in federated learning is provided. The computer program product comprises a computer readable storage medium having program instructions embodied therewith, and the program instructions are executable by one or more processors. The program instructions are executable to: generate, by a server in a federated learning system, a training dataset including malicious data samples and benign data samples; train, by the server, update-generating models on the malicious data samples and the benign data samples in the training dataset; generate, by the server, benign model updates and malicious model updates, through training the update-generating models; train, by the server, an anomaly detector on the malicious model updates and the benign model updates; and deploy, by the server, the anomaly detector to the federated learning system, for supervised anomaly detection in the federated learning system.

In yet another aspect, a computer system for supervised anomaly detection in federated learning is provided. The computer system comprises one or more processors, one or more computer readable tangible storage devices, and program instructions stored on at least one of the one or more computer readable tangible storage devices for execution by at least one of the one or more processors. The program instructions are executable to generate, by a server in a federated learning system, a training dataset including malicious data samples and benign data samples. The program instructions are further executable to train, by the server, update-generating models on the malicious data samples and the benign data samples in the training dataset. The program instructions are further executable to generate, by the server, benign model updates and malicious model updates, through training the update-generating models. The program instructions are further executable to train, by the server, an anomaly detector on the malicious model updates and the benign model updates. The program instructions are further executable to deploy, by the server, the anomaly detector to the federated learning system, for supervised anomaly detection in the federated learning system.

DETAILED DESCRIPTION

Embodiments of the present invention propose a robust federated learning method. In a federated learning system, a central server learns a supervised anomaly detector based on the self-generated malicious updates or adversarial data generated from a variety of state-of-the-art poisoning attacks. The supervised anomaly detector is deployed in the federated learning system to detect adversary updates sent from adversary clients of federated learning.

Figure 1:
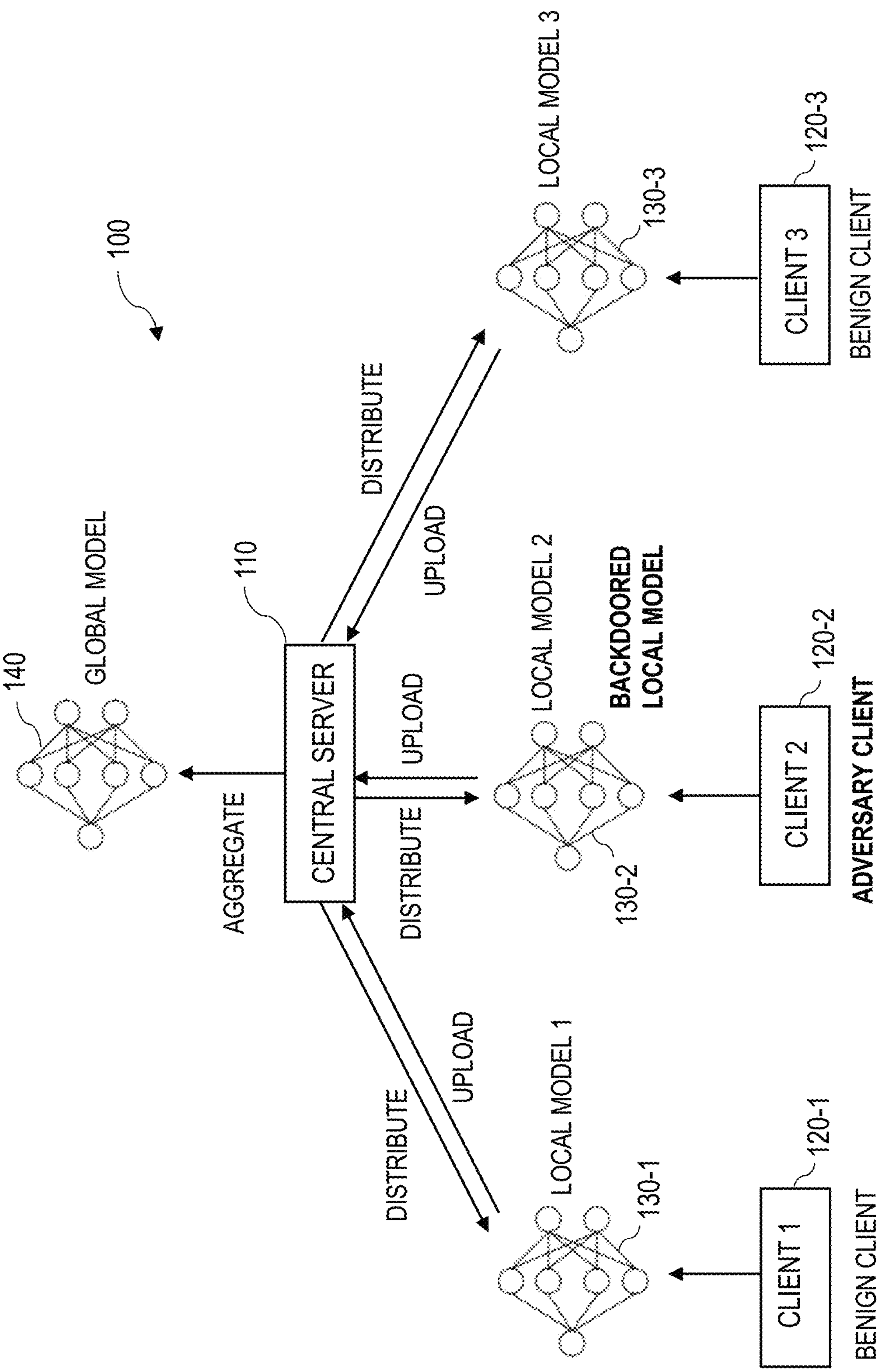
FIG. 1 illustrates a federated learning system with one or more adversary clients, in accordance with one embodiment of the present invention.

FIG. 1 illustrates federated learning system 100 with one or more adversary clients, in accordance with one embodiment of the present invention. For the purpose of illustration, FIG. 1 shows federated learning system 100 including central server 110 and three clients. As shown in FIG. 1, federated learning system 100 includes client 1 120-1, client 2 120-2, and client 3 120-3; client 2 120-2 is an adversary client, while client 1 120-1 and client 3 120-3 are benign clients. FIG. 1 shows only an example of the plurality of the benign clients and adversary clients.

Central server 110 sends model parameters to client 1 120-1, client 2 120-2, and client 3 120-3. Client 1 120-1, client 2 120-2, and client 3 120-3 train local model 1 130-1, local model 2 130-2, and local model 3 130-3, respectively. Among the local models, local model 2 130-2 from the adversary client (client 2 120-2) is a backdoored local model. Client 1 120-1, client 2 120-2, and client 3 120-3 upload parameters of local model 1 130-1, local model 2 130-2, and local model 3 130-3 to central server 110, respectively. Without knowing malicious model updates from one or more adversary clients, central server 110 aggregates the parameters of all the local models including the parameters of local model 2 130-2 from the adversary client (client 2 120-2), when updating global model 140. Including the parameters of local model 2 130-2 from the adversary client (client 2 120-2) in the aggregation leads to poor performance of updating global model 140.

Figure 2:
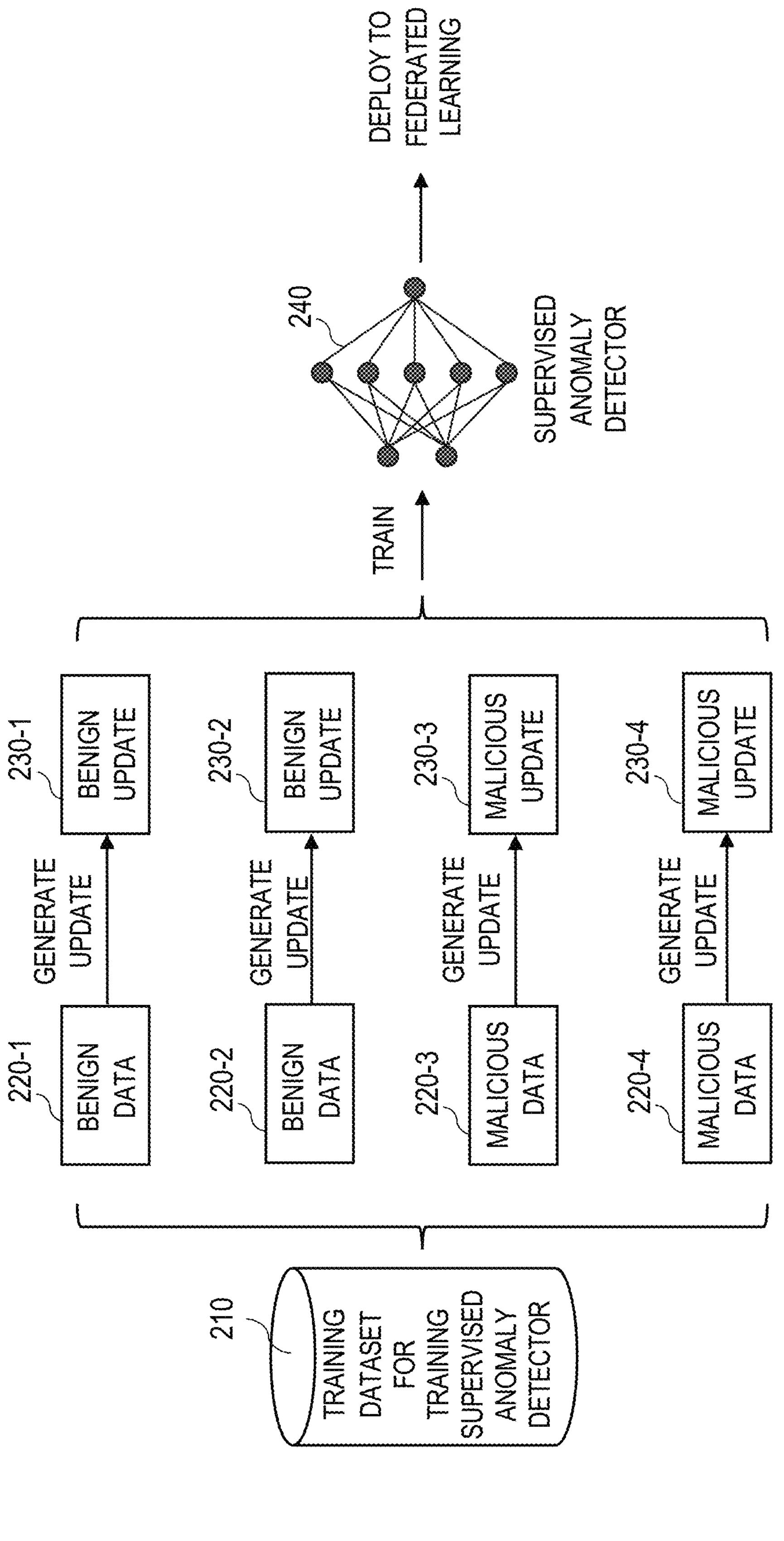
FIG. 2 illustrates training a supervised anomaly detector, in accordance with one embodiment of the present invention.

FIG. 2 illustrates training a supervised anomaly detector, in accordance with one embodiment of the present invention. To train the supervised anomaly detector for detecting malicious model updates from one or more adversary clients, a central server (e.g., central server 110 shown in FIG. 1) generates training dataset 210 for training a supervised anomaly detector. Training dataset 210 includes malicious data samples (e.g., malicious data 220-3 and malicious data 220-4) and benign data samples (e.g., benign data 220-1 and benign data 220-2). In training dataset 210, benign data samples for training the anomaly detector is a small fraction of the whole training dataset of federated learning. The malicious data samples are constructed by poisoning attacks which is constituted by poisoning patterns of different sizes or locations.

The central server generates benign model updates using benign data samples and generates malicious model updates using malicious data samples. For example, as shown in FIG. 2, the central server generates benign update 230-1 using benign data 220-1 and benign update 230-2 using benign data 220-2; the central server generates malicious update 230-3 using malicious data 220-3 and malicious update 230-4 using benign data 220-4.

The central server uses benign update 230-1, benign update 230-2, malicious update 230-3, and malicious update 330-4 to train supervised anomaly detector 240. Upon completion of training supervised anomaly detector 240, the central server deploys supervised anomaly detector 240 to a federated learning system.

Figure 3:
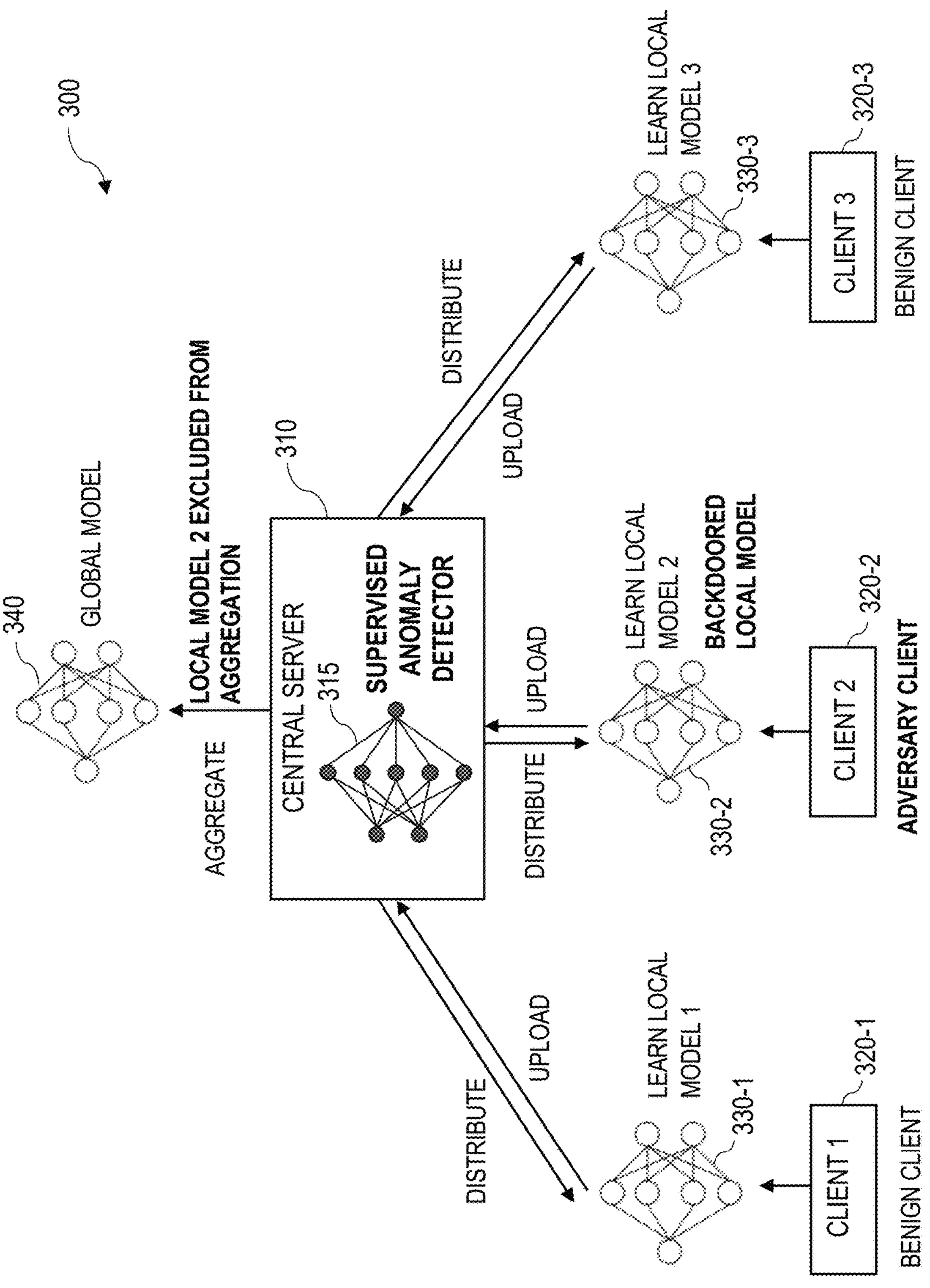
FIG. 3 illustrates a federated learning system with a deployed supervised anomaly detector, in accordance with one embodiment of the present invention.

FIG. 3 illustrates federated learning system 300 with a deployed anomaly detector, in accordance with one embodiment of the present invention. Similar to system 100 shown in FIG. 1, system 300 includes client 1 320-1, client 2 320-2, and client 3 320-3; client 2 320-2 is an adversary client, while client 1 320-1 and client 3 320-3 are benign clients. FIG. 3 shows only an example of the plurality of the benign clients and adversary clients. Client 1 320-1, client 2 320-2, and client 3 320-3 train local model 1 330-1, local model 2 330-2, and local model 3 330-3, respectively. Among the local models, local model 2 330-2 from the adversary client (client 2 320-2) is a backdoored local model. Client 1 320-1 and client 3 320-3 send benign model updates to server 310, while client 2 320-2 sends a malicious model update to server 310.

Central server 310 includes supervised anomaly detector 315. Supervised anomaly detector 315 is deployed on central server 310, after supervised anomaly detector 315 is trained on a training dataset for training a supervisory anomaly detector. Training a supervised anomaly detector on malicious data samples and benign data samples is described in previous paragraphs with reference to FIG. 2.

When receiving the parameters of local model 1 330-1, local model 2 330-2, and local model 3 330-3, central server 310 run supervised anomaly detector 315. The parameters of local model 2 330-2 from adversary client 2 320-2 are flagged by supervised anomaly detector 315 as a malicious update. When central server 310 aggregates the parameters of local models to update global model 340, the parameters of local model 2 330-2 from adversary client 2 320-2 are excluded from aggregation.

Figure 4:
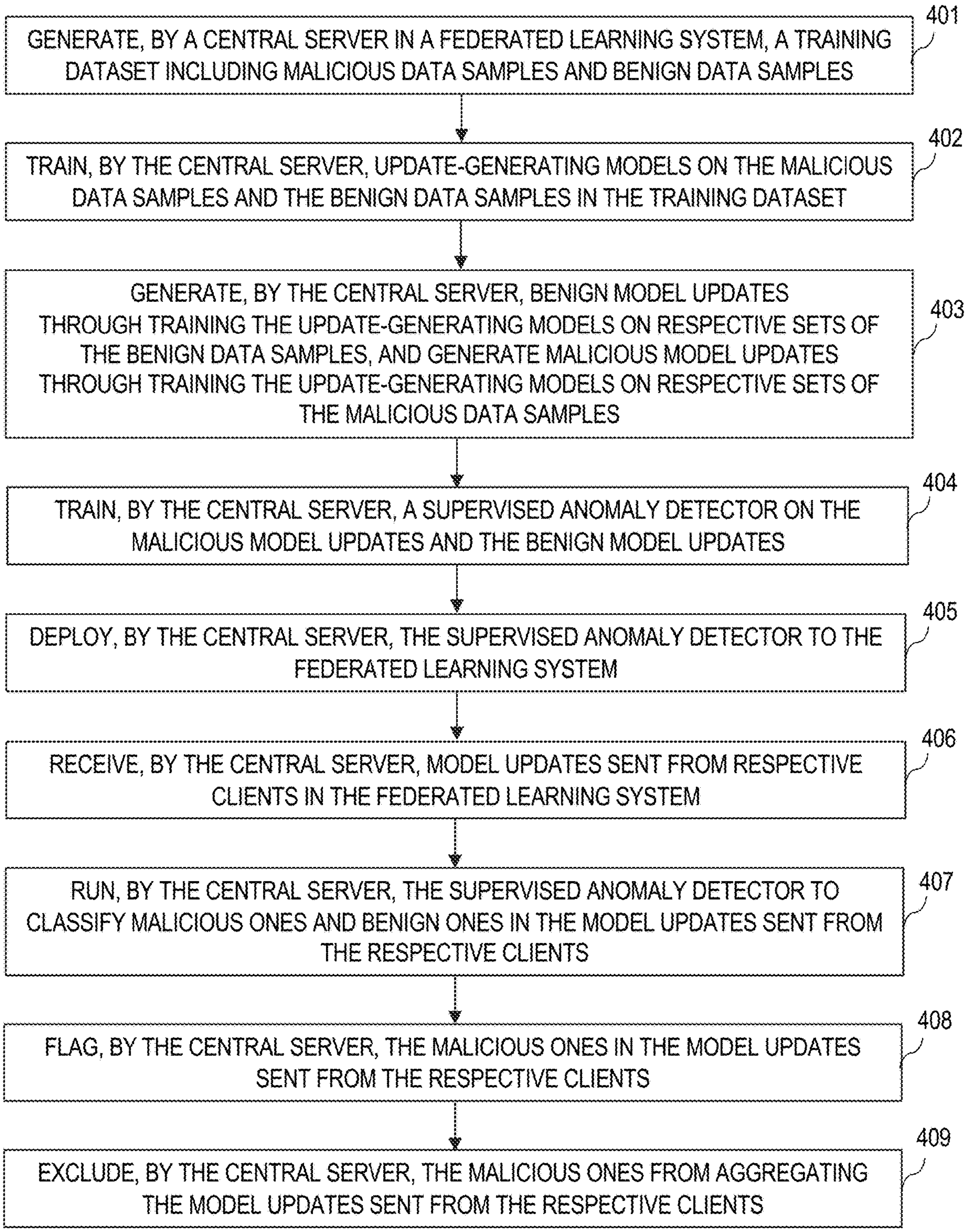
FIG. 4 is a flowchart showing operational steps of supervised anomaly detection in federated learning, in accordance with one embodiment of the present invention.
Figure 5:
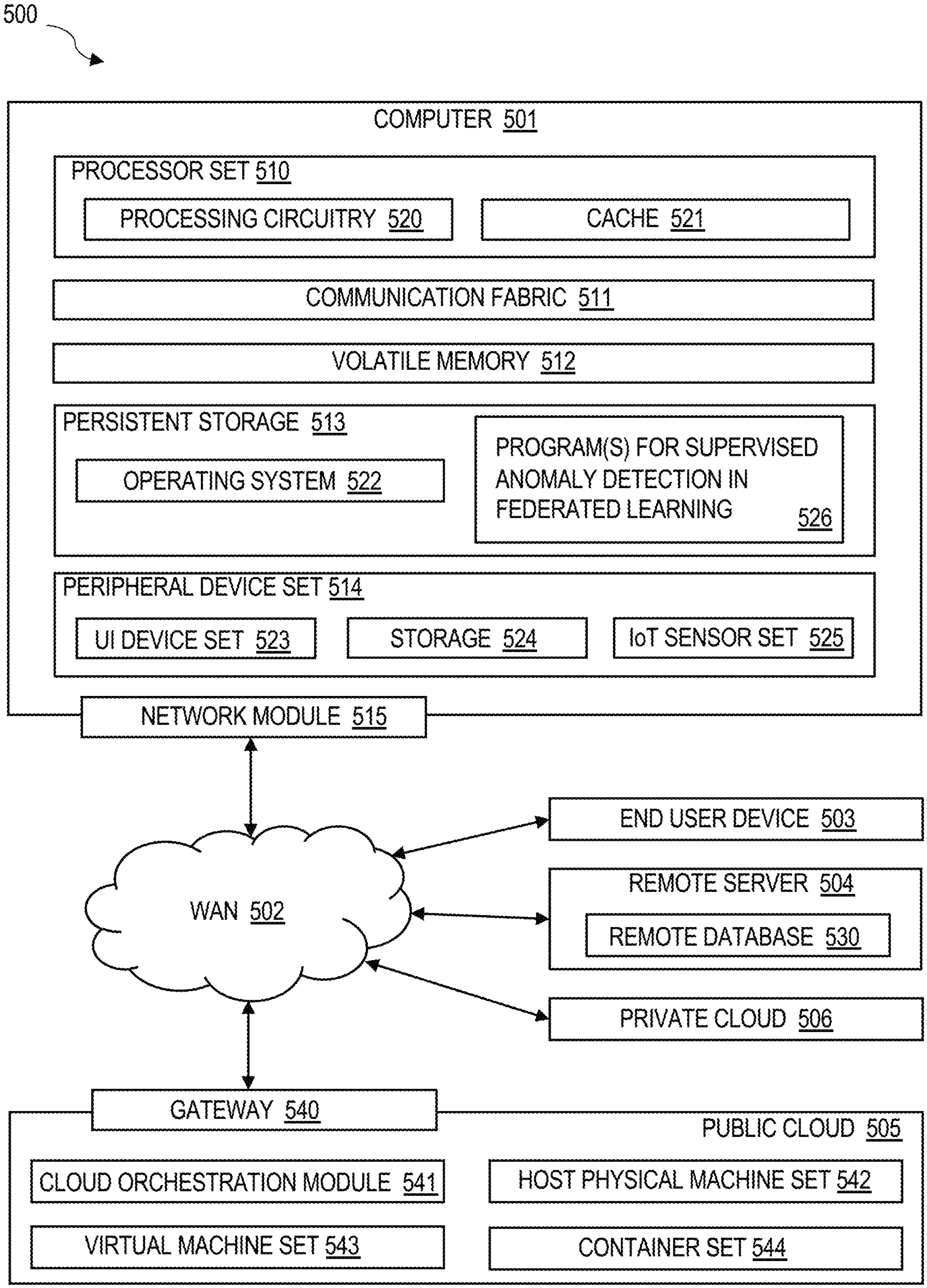
FIG. 5 is a systematic diagram illustrating an example of an environment for the execution of at least some of the computer code involved in supervised anomaly detection in federated learning, in accordance with one embodiment of the present invention.

FIG. 4 is a flowchart showing operational steps of supervised anomaly detection in federated learning, in accordance with one embodiment of the present invention. The operational steps are implemented by a central server in a federated learning system. The central server may be situated on a computer such as computer 501 shown in FIG. 5.

In step 401, the central server in the federated learning system generates a training dataset including malicious data samples and benign data samples. The benign data samples for training a supervised anomaly detector is a small fraction of a training dataset used for federated learning. The central server constructs the malicious data samples by poisoning attacks which is constituted by poisoning patterns of different sizes or locations. In the example shown in FIG. 2, training dataset 210 is generated and includes benign data 220-1, benign data 220-2, malicious data 220-3, and malicious data 220-4.

In step 402, the central server trains update-generating models on the malicious data samples and the benign data samples in the training dataset. The update-generating models are initially trained locally by respective clients in the federated learning system and then uploaded to the central server. Upon receiving the update-generating models, the central server uses the malicious data samples and the benign data samples to train the update-generating models on the central server. In the example shown in FIG. 2, benign data 220-1, benign data 220-2, malicious data 220-3, and malicious data 220-4 are used by the central server to train the update-generating models.

In step 403, through training the update-generating models on respective sets of the benign data samples, the central server generates benign model updates; through training the update-generating models on respective sets of the malicious data samples, the central server generates malicious model updates. In the example shown in FIG. 2, benign data 220-1 and benign data 220-2 are used by the central server to generate benign update 230-1 and benign update 230-2, respectively. In the example shown in FIG. 2, malicious data 220-3 and malicious data 220-4 are used by the central server to generate malicious update 230-3 and malicious update 230-4, respectively.

In step 404, the central server trains a supervised anomaly detector on the malicious model updates and the benign model updates. The malicious model updates and the benign model updates are generated in step 403. In the example shown in FIG. 2, benign update 230-1, benign update 230-2, malicious update 230-3, and malicious update 230-4 are used by the central server to train supervised anomaly detector 240.

In step 405, the central server deploys the supervised anomaly detector to the federated learning system. The supervised anomaly detector is deployed for supervised anomaly detection in the federated learning system. The supervised anomaly detector may be deployed on the central server. In the example shown in FIG. 3, supervised anomaly detector 315 is deployed on central server 310.

From step 401 to step 405, the central server trains the supervised anomaly detector on the malicious model updates and the benign model updates and deploys the supervised anomaly detector in the federated learning system, e.g., on the central server in the federated learning system. Upon deployment of the supervised anomaly detector, the central server is capable of performing supervised anomaly detection in federated learning. In next paragraphs, supervised anomaly detection in federated learning will be described.

In step 406, the central server receives model updates sent from respective clients in the federated learning system. In the example shown in FIG. 3, central server 310 on which supervised anomaly detector 315 is deployed receives the parameters of local model 1 330-1 sent from benign client 1 320-1, the parameters of local model 2 330-2 sent from adversary client 2 320-2, and the parameters of local model 3 330-3 sent from benign client 3 320-3.

In step 407, the central server runs the supervised anomaly detector to classify malicious ones and benign ones in the model updates sent from the respective clients. In the example shown in FIG. 3, central server 310 runs supervised anomaly detector 315 to identify which updates are benign and which updates are malicious; supervised anomaly detector 315 identifies that the updates sent from client 1 320-1 and client 3 320-3 are benign, while supervised anomaly detector 315 identifies that the update sent from client 2 320-2 is malicious.

In step 408, the central server flags the malicious ones in the model updates sent from the respective clients. Upon identifying the malicious model updates, the supervised anomaly detector on the central server will flag the malicious model updates. In the example shown in FIG. 3, supervised anomaly detector 315 on central server 310 flags the update sent from client 2 320-2.

In step 409, the central server excludes the malicious ones from aggregating the model updates sent from the respective clients. Because the malicious updates from adversary clients have been identified and flagged, the central server is capable of updating a global model by aggregating the benign model updates only, and the flagged malicious updates are excluded from aggregation by the central server. In the example shown in FIG. 3, for the aggregation to update global model 340, central server 310 does not include the parameters of local model 2 330-2 sent from adversary client 2 320-2.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code involved in performing the inventive methods, such as such as program(s) 526 for supervised anomaly detection in federated learning. In addition to block 526, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 526, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 526 in persistent storage 513.

Communication fabric 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 526 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501.

Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

What is claimed is:

1. A computer-implemented method for supervised anomaly detection in federated learning, the method comprising:

generating, by a central server in a federated learning system a training dataset, the training dataset including malicious data samples and benign data samples, the malicious data samples generated using poisoning attacks;

training, by the central server, update-generating models utilizing the malicious data samples and the benign data samples in the training dataset;

generating, by the central server, benign model updates and malicious model updates, through training the update-generating models;

training, by the central server, an anomaly detector on the malicious model updates and the benign model updates;

deploying, by the central server, the anomaly detector to the federated learning system, for supervised anomaly detection in the federated learning system;

receiving, by the central server, model updates sent from respective clients in the federated learning system;

running, by the central server, the anomaly detector to classify malicious model updates and benign model updates in the model updates received from respective clients in the federated learning system;

flagging, by the central server, the malicious model updates in the model updates received from the respective clients; and excluding, by the central server, the malicious model updates from aggregating the model updates received from the respective clients.

2. The computer-implemented method of claim 1, further comprising:

generating, by the central server, the benign model updates, through training the update-generating models on respective sets of the benign data samples; and generating, by the central server, the malicious model updates, through training the update-generating models on respective sets of the malicious data samples.

3. The computer-implemented method of claim 1, wherein the anomaly detector is deployed on the central server.

4. The computer-implemented method of claim 1, wherein the update-generating models are initially trained locally by respective clients in the federated learning system and uploaded to the central server, and then the central server uses the malicious data samples and the benign data samples to train the update-generating models.

5. The computer-implemented method of claim 1, wherein the benign data samples is a small fraction of a training dataset of federated learning.

6. The computer-implemented method of claim 1, wherein the central server constructs the malicious data samples by poisoning attacks which is constituted by poisoning patterns of different sizes or locations.

7. A computer program product for supervised anomaly detection, the computer program product comprising a computer readable storage medium having program instructions embodied therewith, the program instructions executable by one or more processors, the program instructions executable to:

generate, by a central server in a federated learning system a training dataset, the training dataset including malicious data samples and benign data samples, the malicious data samples generated using poisoning attacks;

train, by the central server, update-generating models utilizing the malicious data samples and the benign data samples in the training dataset;

generate, by the central server, benign model updates and malicious model updates, through training the update-generating models;

train, by the central server, an anomaly detector on the malicious model updates and the benign model updates; and deploy, by the central server, the anomaly detector to the federated learning system, for supervised anomaly detection in the federated learning system;

receive, by the central server, model updates sent from respective clients in the federated learning system;

run, by the central server, the anomaly detector to classify malicious model updates and benign model updates in the model updates received from respective clients in the federated learning system;

flag, by the central server, the malicious model updates in the model updates received from the respective clients; and exclude, by the central server, the malicious model updates from aggregating the model updates received from the respective clients.

8. The computer program product of claim 7, further comprising the program instructions executable to:

generate, by the central server, the benign model updates, through training the update-generating models on respective sets of the benign data samples; and generate, by the central server, the malicious model updates, through training the update-generating models on respective sets of the malicious data samples.

9. The computer program product of claim 7, wherein the anomaly detector is deployed on the central server.

10. The computer program product of claim 7, wherein the update-generating models are initially trained locally by respective clients in the federated learning system and uploaded to the central server, and then the central server uses the malicious data samples and the benign data samples to train the update-generating models.

11. The computer program product of claim 7, wherein the benign data samples is a small fraction of a training dataset of federated learning.

12. The computer program product of claim 7, wherein the central server constructs the malicious data samples by poisoning attacks which is constituted by poisoning patterns of different sizes or locations.

13. A computer system for supervised anomaly detection, the computer system comprising one or more processors, one or more computer readable tangible storage devices, and program instructions stored on at least one of the one or more computer readable tangible storage devices for execution by at least one of the one or more processors, the program instructions executable to:

generate, by a central server in a federated learning system, a training dataset including malicious data samples and benign data samples;

train, by the central server, update-generating models on the malicious data samples and the benign data samples in the training dataset;

generate, by the central server, benign model updates and malicious model updates, through training the update-generating models;

train, by the central server, an anomaly detector on the malicious model updates and the benign model updates;

deploy, by the central server, the anomaly detector to the federated learning system, for supervised anomaly detection in the federated learning system;

receive, by the central server, model updates sent from respective clients in the federated learning system;

run, by the central server, the anomaly detector to classify malicious model updates and benign model updates in the model updates received from respective clients in the federated learning system;

flag, by the central server, the malicious model updates in the model updates received from the respective clients; and exclude, by the central server, the malicious model updates from aggregating the model updates received from the respective clients.

14. The computer system of claim 13, further comprising the program instructions executable to:

generate, by the central server, the benign model updates, through training the update-generating models on respective sets of the benign data samples; and generate, by the central server, the malicious model updates, through training the update-generating models on respective sets of the malicious data samples.

15. The computer system of claim 13, wherein the anomaly detector is deployed on the central server.

16. The computer system of claim 13, wherein the update-generating models are initially trained locally by respective clients in the federated learning system and uploaded to the central server, and then the central server uses the malicious data samples and the benign data samples to train the update-generating models.

17. The computer system of claim 13, wherein the benign data samples is a small fraction of a training dataset of federated learning, wherein the central server constructs the malicious data samples by poisoning attacks which is constituted by poisoning patterns of different sizes or locations.

* * * * *